United States Patent
Kin-Lung

[11] Patent Number: 6,021,208
[45] Date of Patent: Feb. 1, 2000

[54] HIDDEN SPEAKER ENCLOSURE STRUCTURE

[76] Inventor: Lien Kin-Lung, P.O. Box 82-144, Taipei, Taiwan

[21] Appl. No.: 08/951,791

[22] Filed: Sep. 29, 1997

[51] Int. Cl.⁷ .................................................. H04R 25/00
[52] U.S. Cl. ......................... 381/338; 381/350; 381/386; 181/199
[58] Field of Search .................................... 381/153, 154, 381/158, 159, 160, 162, 338, 337, 339, 340, 347, 350, 341, 391; 181/152, 159, 160, 196, 197, 198, 199

[56] References Cited

U.S. PATENT DOCUMENTS

| | | | |
|---|---|---|---|
| 4,616,731 | 10/1986 | Robinson | 181/199 |
| 5,111,509 | 5/1992 | Takeuchi et al. | 181/160 |
| 5,117,463 | 5/1992 | Oyabe et al. | 181/159 |

*Primary Examiner*—Huyen Le
*Attorney, Agent, or Firm*—A & J

[57] ABSTRACT

The invention herein relates to a kind of hidden speaker enclosure structure that is comprised of a sound chamber, a chamber cover, a speaker and a sound tube, of which the speaker is positioned inside the sound chamber and the chamber cover is sealed onto the opening of the sound chamber to enable the speaker to be concealed within the sound chamber. Furthermore, there are more than one insertion holes through the surface of chamber cover for the insertion of sound tubes that serve as the only media interface between the sealed sound chamber and the air outside. Since the speaker is positioned inside a small sealed space, driven under maximum efficiency conditions, the speaker can be matched with sound tubes of different widths and lengths to convey and produce high transmitted frequencies and, furthermore, call filter the original physical audio spectrum of the speaker. As the invention herein can be hidden inside various decorative objects or articles of normal daily use, no additional space occupancy is required to enjoy listening to music.

1 Claim, 7 Drawing Sheets

HIDDEN SPEAKER ENCLOSURE STRUCTURE

DETAILED DESCRIPTION OF THE INVENTION

1. Field of the Invention

The invention herein relates to a kind of hidden speaker enclosure structure that can be utilized in ordinary articles of daily life or various decorative objects and, furthermore, can be concealed and not occupy additional space, and besides enabling objects and article to produce music, the invention herein causes listeners to wonder where the sound source is located and, therefore, achieves an interesting and novel effect.

2. Background of the Invention

Conventional sound equipment includes speaker enclosures to achieve audio output performance and inside the speaker enclosures are a number of speakers of various frequency response. Speakers vibrate the air, enabling the diaphragm vibrations to produce audio frequencies that permeate the speaker enclosure and are thereby emitted as sound to achieve amplification and presence capabilities.

However, the large physical dimensions of speaker enclosures occupies space and as a result are difficult to conceal. Furthermore, while there have been numerous variations in the exterior shape, none has led to any significant changes.

Technological Means and Structure of the Invention

In view of foregoing situation, the inventor developed an improved speaker enclosure comprised of a sound chamber, a chamber cover, a speaker and more than one sound tube. Of these, the speaker is positioned inside the sound chamber and the chamber cover is sealed onto the opening of the sound chamber to enable the concealment of the speaker within the sound chamber. Furthermore, there are more than one insertion holes through the chamber cover for the insertion of sound tubes that serve as the only medium interface channel between the sealed sound chamber and the air outside. Since the speaker is positioned inside a small sealed space, driven under maximum efficiency conditions, the speaker can be matched with sound tubes of different widths and lengths to convey and produce high transmitted frequencies and, furthermore, can filter the original physical audio spectrum of the speaker.

Functions and Effects

A. The embodiments of the invention herein has the following functions:

(1) The sound waves produced by the speaker are conveyed by the sound tubes and, therefore, the sound tubes are the only medium interface channel capable of carrying the sound waves and, furthermore, the thickness, the narrowness, the degree of hardness, and length, etc. are correlated with the audio frequency and tonal color response.

(2) Utilizing a high efficiency driver, the speaker conveyance surface area is reduced, but conveying the output through sound tubes of the desired audio frequency achieves the required audio frequency separation and clarity and, furthermore, filters the original physical audio spectrum of the speaker and thereby increases the original sound conveyance capability.

(3) Since the dimensions are minimal and does not occupy space, the speaker enclosure is well suited for concealment.

B. The embodiments of the invention herein has the following effects:

(1) The speaker enclosure can be concealed inside ordinary articles of daily life or various decorative objects and in addition to effective concealment, does not occupy space and, furthermore, effectively allows the enjoyment of music.

(2) Since the speaker enclosure can be effectively concealed, curiosity about the source of the sound is aroused in the listener, achieving an interesting and novel effect.

(3) Sound tubes of different size, width, hardness and length are capable of varying the audio frequency and tonal color response.

Embodiments

The section below is based on the drawings of the embodiments of the invention herein and is followed by a detailed description:

FIG. 1 is an isometric exploded drawing of the speaker enclosure invention herein, with the drawing indicating a speaker enclosure (1) that is comprised of a sound chamber (2), a chamber cover (3), a speaker (4) and more than one sound tube (5). Of these, the speaker (4) is positioned inside the sound chamber (2), the chamber cover (3) is affixed onto the opening (21) of the sound chamber (2) and thereby seals the speaker within the sound chamber (2), with the wires (41) of the speaker (4) passed through the insertion holes (22) under the sound chamber (2) (as further indicated in FIG. 2).

There are small holes (31) and (21) in the surface of the aforementioned chamber cover (3) and the sound chamber (2), and the hole-to-hole positioning is in symmetrical alignment such that a number of screws (6) can be utilized to securely fasten the chamber cover (3) to the sound chamber (2). Furthermore, ultrasonic fusion, adhesives, circlips or other means can be utilized to accomplish the aforesaid fastening.

There is also more than one insertion hole (32) through the surface of the chamber cover (3) for the insertion of a long pliable sound tube (5) and since the end (51) of the sound tube (5) is at the face of the speaker, the end (51) cannot be inserted past the insertion hole (32) (as indicated in the cross-sectional drawing of FIG. 2), and the aforesaid sound tube (5) becomes the only medium interface channel between the sealed sound chamber (2) and the air outside. In FIG. 2, since the speaker (4) is positioned inside the sealed diminutive space of the sound chamber (2), when sound waves are produced in the sound chamber (2), the sound waves are forced to output through the sound tube (5) in a manner productive of a relatively high frequency, which filters extraneous noise and enables improved sound quality.

The sound tube (5) can be constructed of plastic, rubber or other materials of similar characteristics, with the hardness, thickness, size and length capable of altering the volume, frequency, timbre, quality and frequency spectrum of the sound waves as follows:

(1) Using a harder material sound tube: Raises the audio frequency. Using a softer material sound tube: Lowers the audio frequency.

(2) Enlarging the sound tube diameter: Lowers the audio frequency. Reducing the sound tube diameter: Raises the audio frequency.

(3) Lengthening the sound tube: Raises the audio frequency. Shortening the sound tube: Lowers the audio frequency.

(4) Increasing the number of sound tubes: Lowers the audio frequency. Decreasing the number of sound tubes: Raises the audio frequency.

Since different sound tubes (5) cause the production of sound waves at different audio frequencies and, furthermore, indirectly affects timbre and sound quality to commensurately achieve different functional effects, sound tube (5) utilization is subject to the variables of hardness, thickness, size, length and number, etc.

FIG. 3 is an isometric drawing of the speaker enclosure invention herein, with the drawing indicating that the chamber cover (3) is equipped with tube fittings (33) said the sound tubes (5) are slipped over the tube fittings (33), of which one tube is thicker and one tube is thinner; the thicker tube conveys low audio frequencies and the thinner tube conveys high audio frequencies. Furthermore, there are small holes (52) in the thin sound tube, which not only alters the audio frequency, but also amplifies the audible range of sound.

The following refer to the drawings of the embodiments of the invention herein:

FIG. 4 is an orthographic drawing of an embodiment of the speaker enclosure invention herein positioned inside a flower pot and the drawing shows the speaker enclosure (1) as placed inside a flower pot (7), with two (or an even number) sound tubes (5) serving as flower (71) stems that have leaves (72) attached and, furthermore, the upper openings of the sound tubes (5) are concealed inside the pistils (73) and the wires (41) of the speaker (4) are also appropriately concealed. When music is produced, listeners wonder where the source of the music is located.

FIG. 5 is an orthographic drawing of an embodiment of the speaker enclosure invention herein as a flower pot, wherein the sound chamber (2) of the speaker enclosure (1) is in the form of a flower pot and since the sound tubes (5) are again the stems of the flowers, the overall appearance is not only beautiful, but allows the enjoyment of music.

FIG. 6 is an isometric drawing of the doll embodiment of the speaker enclosure invention herein, with the drawing showing that the body (81) of the doll (8) is equipped inside with a speaker enclosure (1) and since the sound tube (5) of the aforesaid speaker enclosure (1) is connected to head (82), the sound source produces from the doll's head.

FIG. 7 is an isometric drawing of the pillow embodiment of the speaker enclosure herein, and illustrated in the drawing is a pillow (9) and a portable audio player (10), with the interior of the pillow (9) equipped with two speaker enclosures (1); the two speaker enclosures (1) are wired together for an external connection and one set of wires (101) is connected to the portable audio player (10). The sound tubes (5) of the two speaker enclosures can be extended to a suitable position, enabling the pillow to produce music for the enjoyment of the user.

FIG. 8 is an isometric drawing of the automobile seat embodiment of the speaker enclosure invention herein, with the drawing illustrating the concealment of a speaker enclosure (1) inside the headrest (201) at the upper extent of all automobile seat (20) an since the sound tube (5) of the aforesaid speaker enclosure (1) can be extended to a suitable position, the driver can enjoy listening to music while driving and be relieved of boredom on the road.

PART NUMBERS OF THE DRAWINGS

Figure 1:
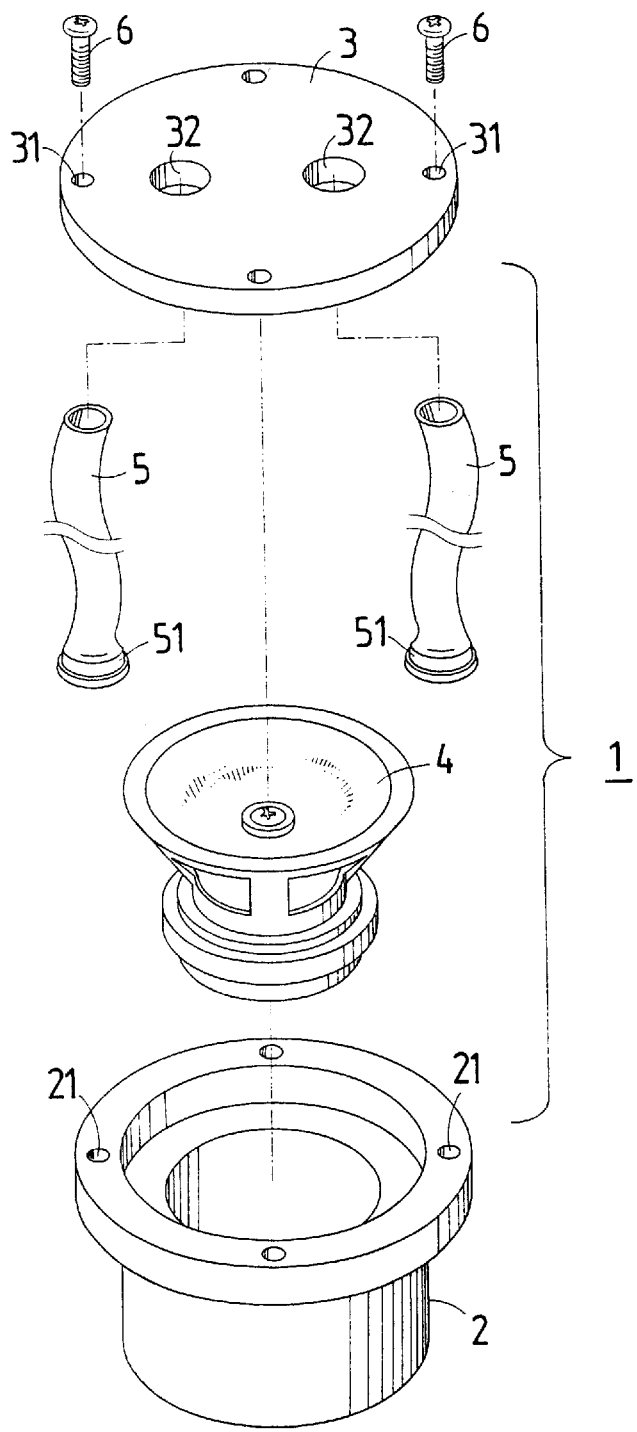
FIG. 1 is an isometric exploded drawing of the speaker enclosure invention herein.
Figure 2:
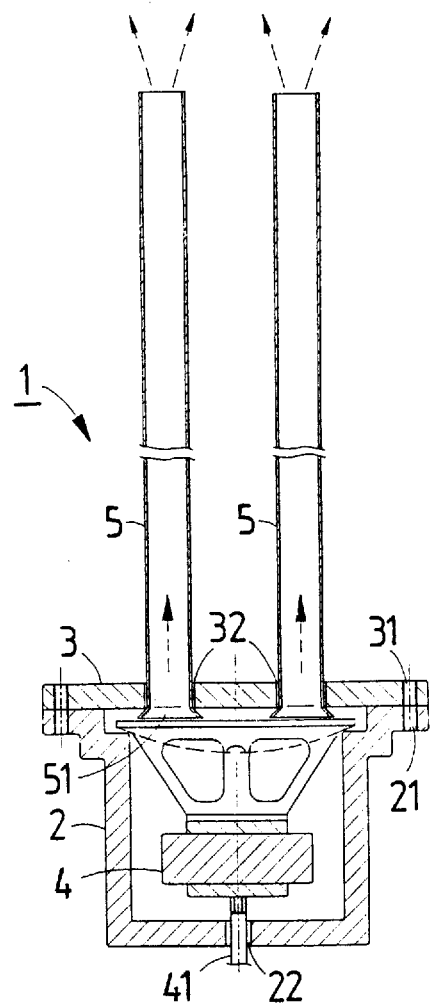
FIG. 2 is a cross-sectional drawing of the speaker enclosure invention herein.
Figure 3:
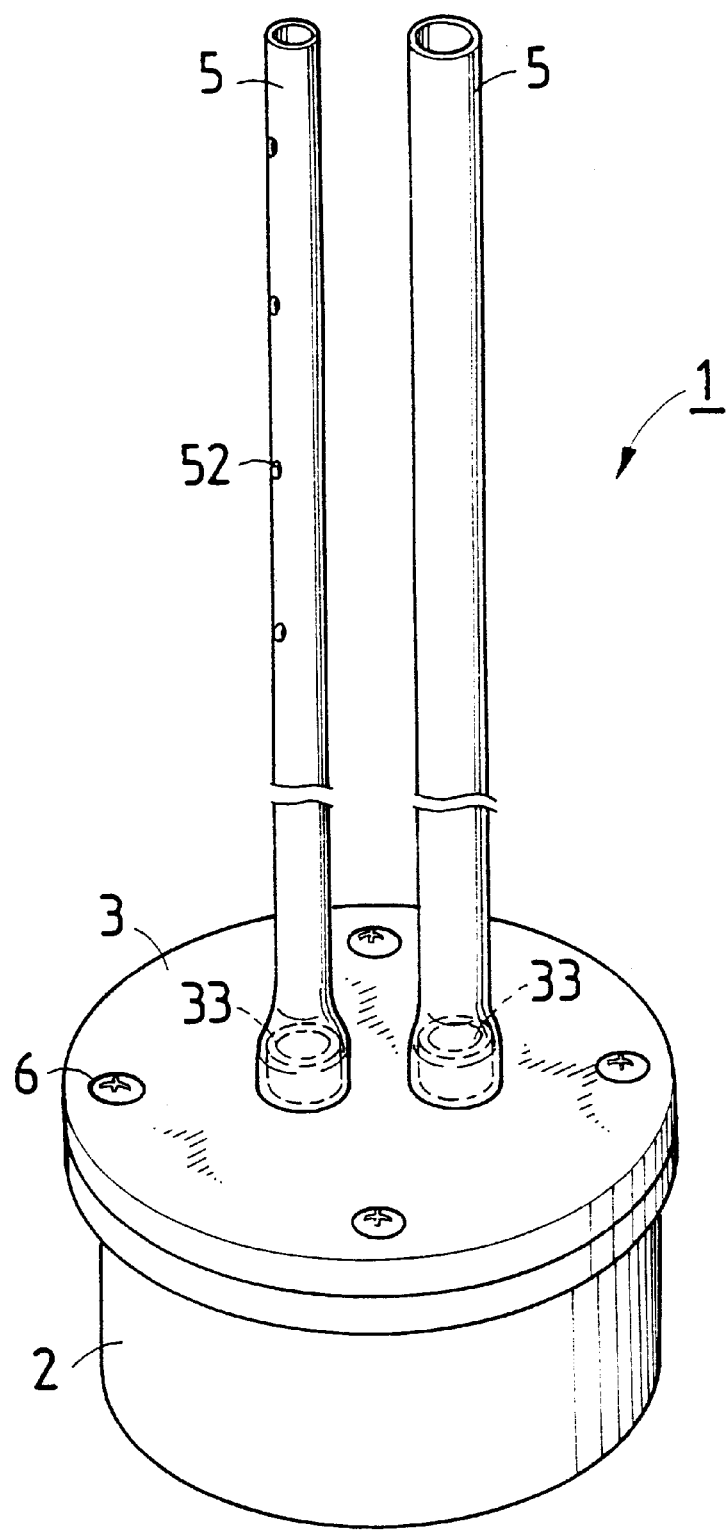
FIG. 3 is an isometric drawing of the speaker enclosure invention herein.
Figure 4:
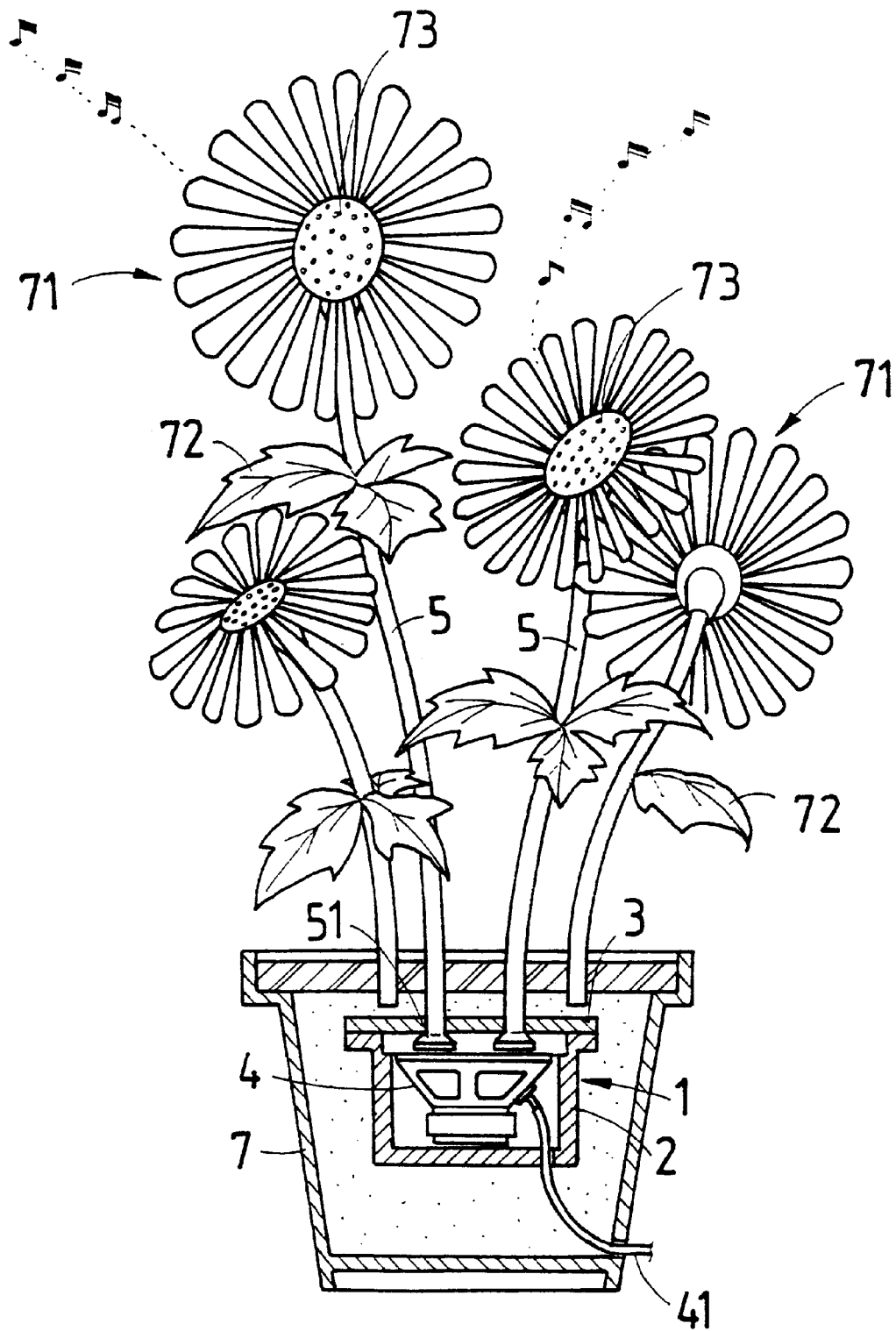
FIG. 4 is an orthographic drawing of an embodiment of the speaker enclosure invention herein, with the cross-sectional area illustrating concealment inside a flower pot.
Figure 5:
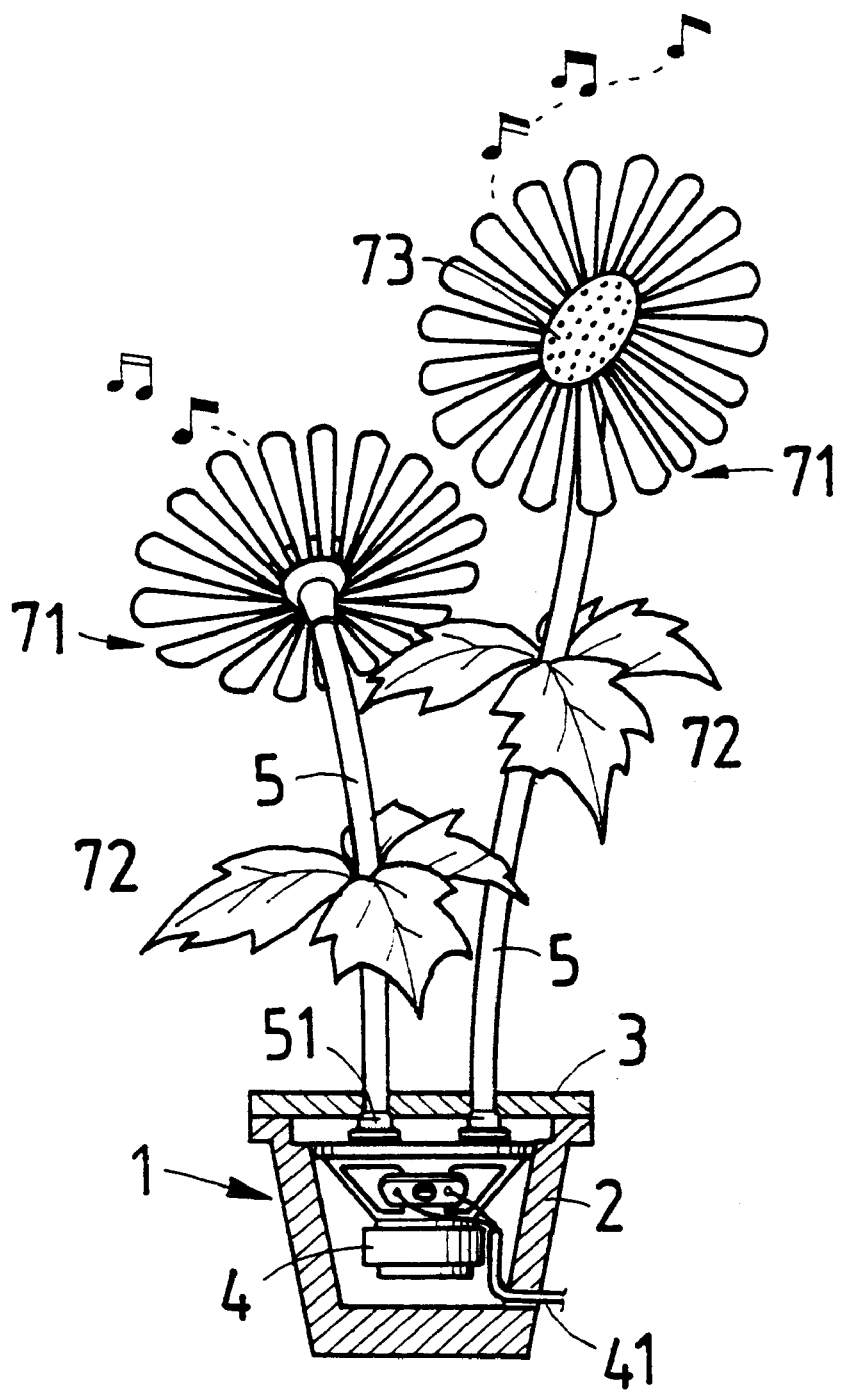
FIG. 5 is an orthographic drawing of an embodiment of the speaker enclosure invention herein, with the cross-sectional area depicting the speaker enclosure as a flower pot.
Figure 6:
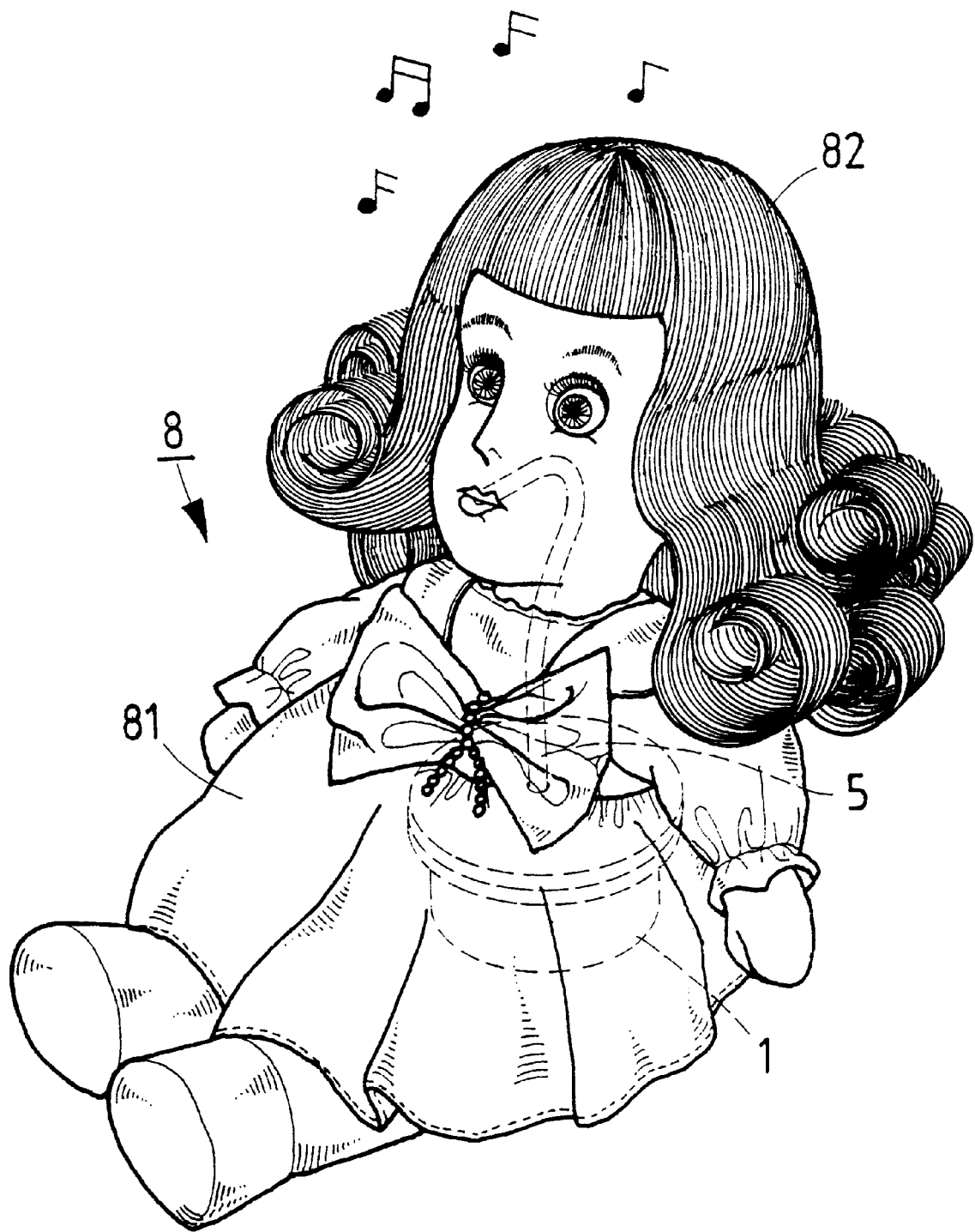
FIG. 6 is an isometric drawing of an embodiment of the speaker enclosure invention herein as installed inside a doll.
Figure 7:
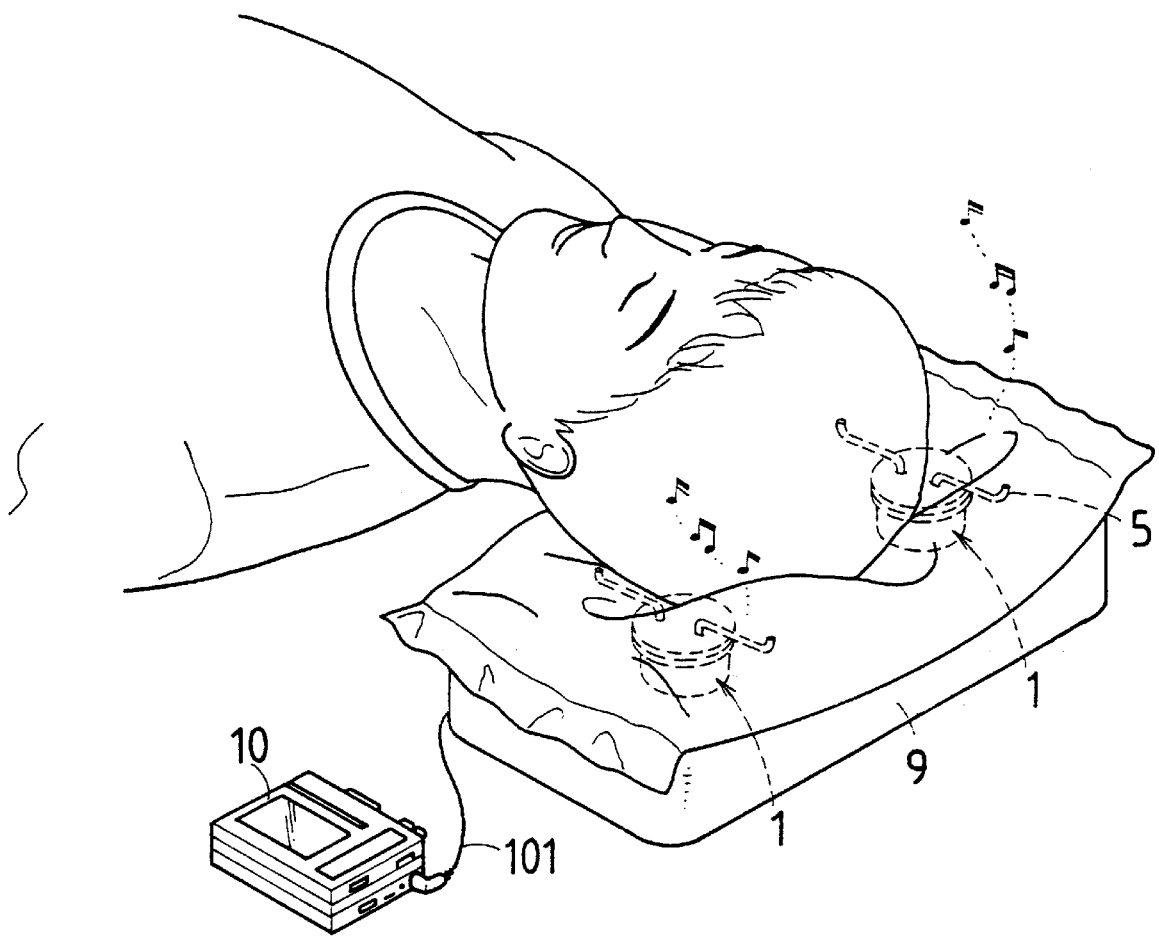
FIG. 7 is an isometric drawing of an embodiment of the speaker enclosure herein as installed inside a pillow.
Figure 8:
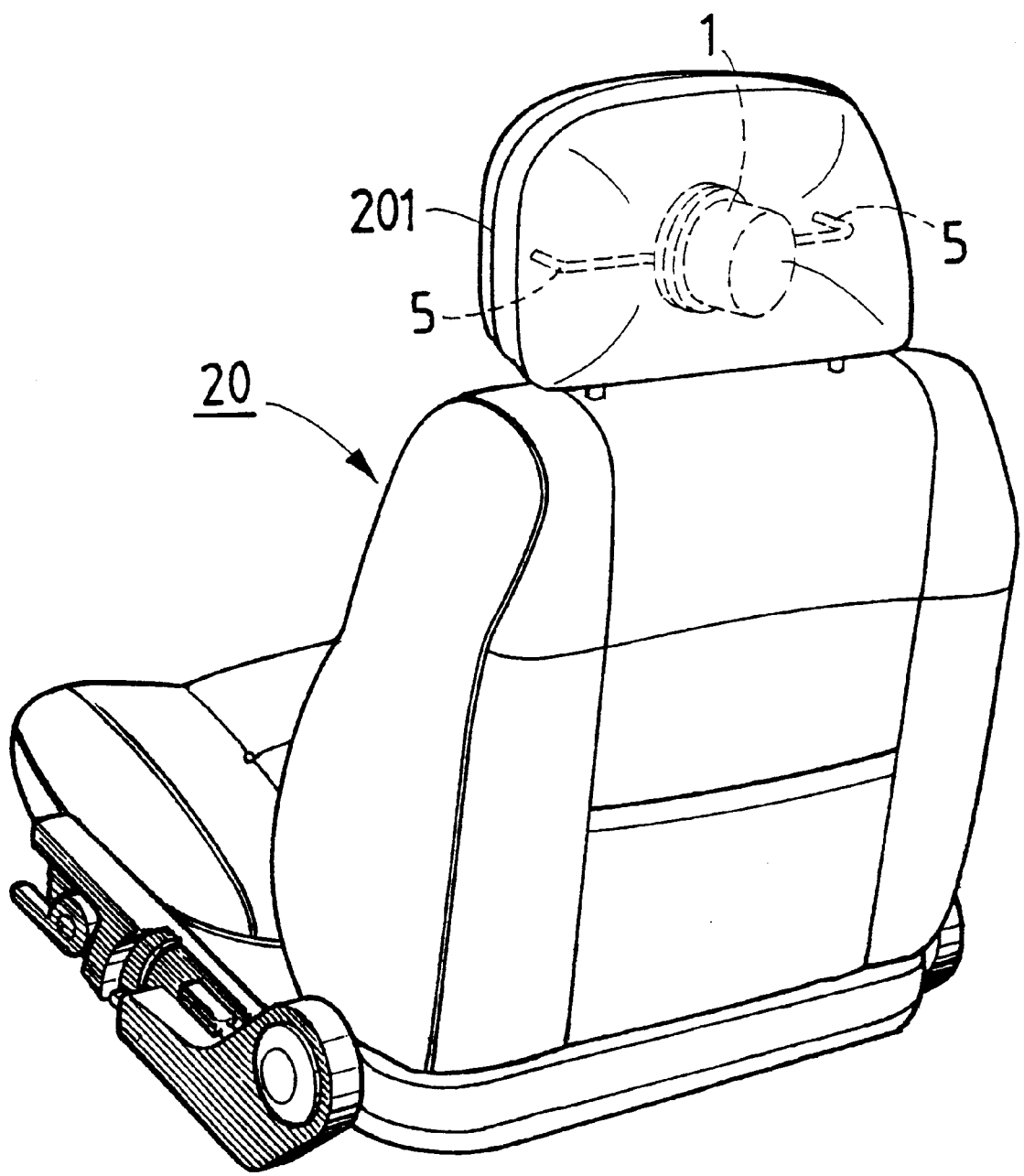
FIG. 8 is an isometric drawing of an embodiment of the speaker enclosure invention herein mounted inside the headrest of an automobile seat.

1-Speaker enclosure
21-Small hole(s)
2-Sound chamber
22-Insertion hole
3-Chamber cover
32-Insertion hole
4-Speaker
5-Sound tube(s)
52-Small hole(s)
7-Flower pot
72-Leaf(s)
8-Doll
82-Head
10-Portable audio player
20-Automobile seat
31-Small hole(s)
33-Tube fitting(s)
41-Wire
51-End(s)
6-Screw(s)
71-Flower(s)
73-Pistil
81-Body
9-Pillow
101-Power supply cable
201-Headrest

What is claimed is:

1. A hidden speaker enclosure structure comprising a sound chamber, a chamber cover, a speaker and a plurality of pliable sound tubes, wherein said speaker is positioned inside said sound chamber and said chamber cover is securely sealed onto an opening of said sound chamber, thereby enabling said speaker to be concealed within said sound chamber, a plurality of insertion holes through a surface of said chamber cover are provided for insertion of said pliable sound tubes that serve as only medium interface channel between said sound chamber and air outside, and wires of said speaker are passed through a plurality of openings under said sound chamber, a plurality of small holes are provided in one of said sound tube and said small holes not only alters audio frequency but also amplifies audible range of sound.

* * * * *